United States Patent [19]

Kishimoto et al.

[11] Patent Number: 5,149,580

[45] Date of Patent: Sep. 22, 1992

[54] VINYLIDENE CYANIDE-VINYL BENZOATE DERIVATIVE NONLINEAR OPTICAL POLYMERS

[75] Inventors: Manabu Kishimoto; Iwao Seo; Atsushi Oda; Yukiko Ohashi; Dechun Zou, all of Ami, Japan

[73] Assignee: Mitsubishi Petrochemical Co., Ltd., Tokyo, Japan

[21] Appl. No.: 747,029

[22] Filed: Aug. 19, 1991

[30] Foreign Application Priority Data

Sep. 28, 1990 [JP] Japan .................. 2-257416

[51] Int. Cl.$^5$ .......................... C08F 222/34
[52] U.S. Cl. .................. 428/220; 525/328.4;
525/276; 525/291; 525/293; 525/295; 525/381;
525/359.3; 525/359.4; 525/359.6; 525/374;
525/376; 525/377; 525/300; 525/245
[58] Field of Search ............. 525/276, 291, 293, 295, 525/328.4; 526/300; 428/220

[56] References Cited

U.S. PATENT DOCUMENTS 5,061,760  10/1991  East et al. ............... 525/328.2

FOREIGN PATENT DOCUMENTS 0415342  3/1991  European Pat. Off.

Primary Examiner—Joseph L. Schofer
Assistant Examiner—M. Nagumo
Attorney, Agent, or Firm—Oblon, Spivak, McClelland, Maier & Neustadt

[57] ABSTRACT

There is disclosed an organic nonlinear optical material which comprises a polymer having the following constitutional units, in amounts of 5 to 100 mole % of (I), 0 to 50 mole % of (II) and 0 to 50 mole % of (III), and a weight average molecular weight (Mw) of the polymer being 10,000 to 2,000,000:

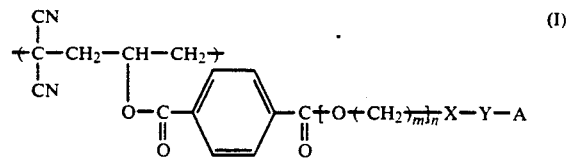

wherein m, n, X, Y and A have the meanings as defined in the specification,

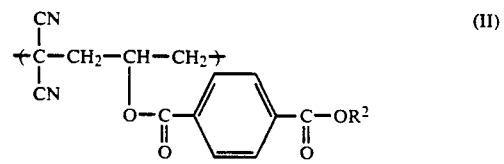

wherein $R^2$ represents an alkyl group, and

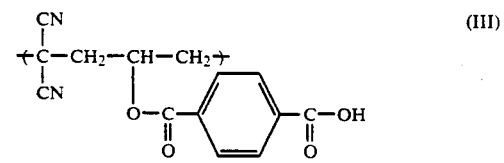

A nonlinear optical element which is tough with wide surface as well as having large nonlinear optical effect can be obtained.

9 Claims, 1 Drawing Sheet

VINYLIDENE CYANIDE-VINYL BENZOATE DERIVATIVE NONLINEAR OPTICAL POLYMERS

BACKGROUND OF THE INVENTION

This invention relates to an optical material useful as an optical element used for optical communication and a field of an optical information processing, particularly to an organic nonlinear optical material having a nonlinear optical effect and excellent in mechanical strength and molding property.

In order to apply laser beam to optical communication, optical information processing and optical processing, an optical element having various functions such as deflection, modulation or wavelength conversion. As such an optical element which assumes a role of the core, an optical material having a nonlinear effect has been known.

As the nonlinear optical material, research have been mainly carried out with respect to inorganic crystalline materials such as $LiNbO_3$, $LiIO$, $KH_2PO_4$ and $GaAs$.

However, these inorganic crystalline materials have involved the problem that a response more rapid than picosecond is difficult since an electron participating in chemical bonding between atoms or ions causes lattice vibration in response to light and also involved the problem that a breakage threshold level thereof to a strong laser beam is low and is $MW/cm^2$ order. Also, these inorganic crystalline materials are generally used as a single crystal so that mechanical strength, particularly impact strength is a little whereby various defects such as bad mold processability are involved.

Also, as a nonlinear optical material, there have been known organic molecular crystalline materials such as urea, p-nitroaniline (p-NA) and 2-methyl-4-nitroaniline (MNA). These organic molecular crystalline materials have a large nonlinear optical effect caused by nonlocalized π electron in the molecule and due to this electron polarization, they do not accept any effect from lattice vibration so that they show more rapid response and higher optical breakage threshold level than those of the inorganic crystalline materials.

These organic molecular crystalline materials are, however, also required to be a single crystal as in the inorganic crystalline materials in order to obtain a large nonlinear optical effect. Thus, those having high characteristics are insufficient in mechanical strength and thermal stability so that there involved drawbacks that their handling is extremely difficult and moldability is poor when molding them into, for example, an optical fiber or film.

SUMMARY OF THE INVENTION

An object of the present invention is to provide an organic nonlinear optical material having a large nonlinear optical effect and excellent in molding processability.

An organic nonlinear optical material of the present invention comprises a polymer having the following constitutional units, in amounts of 5 to 100 mole % of (I), 0 to 50 mole % of (II) and 0 to 50 mole % of (III), and a weight average molecular weight (Mw) of the polymer being 10,000 to 2,000,000:

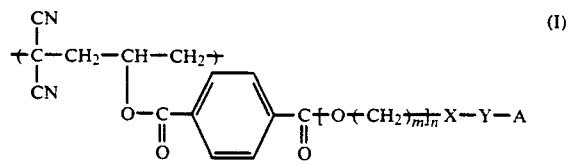

wherein m represents an integer of 1 to 10, n represents 0 or 1, X represents —$NR^1$— or —O—, $R^1$ represents hydrogen, methyl or ethyl, Y represents

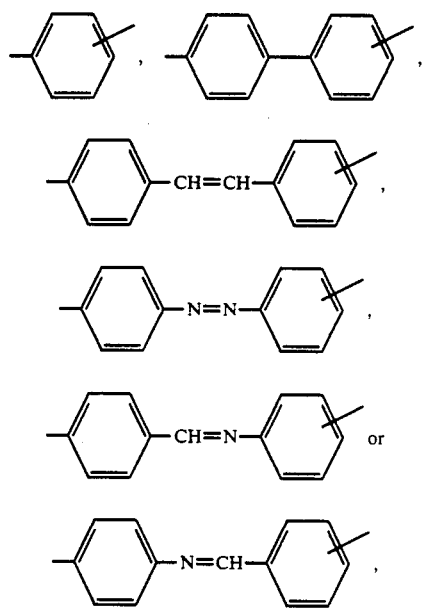

A represents —$NO_2$, —CN, —$CF_3$ or —$SO_2$—$C_lH_{2l+1}$ and $l$ represents an integer of 1 to 100,

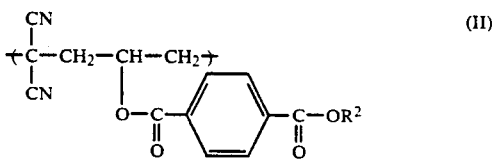

wherein $R^2$ represents an alkyl group, and

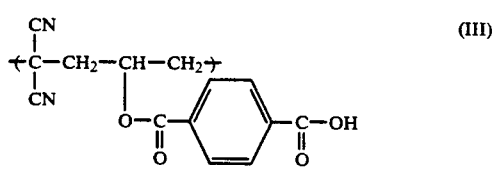

DESCRIPTION OF THE PREFERRED EMBODIMENTS

Figure 1:
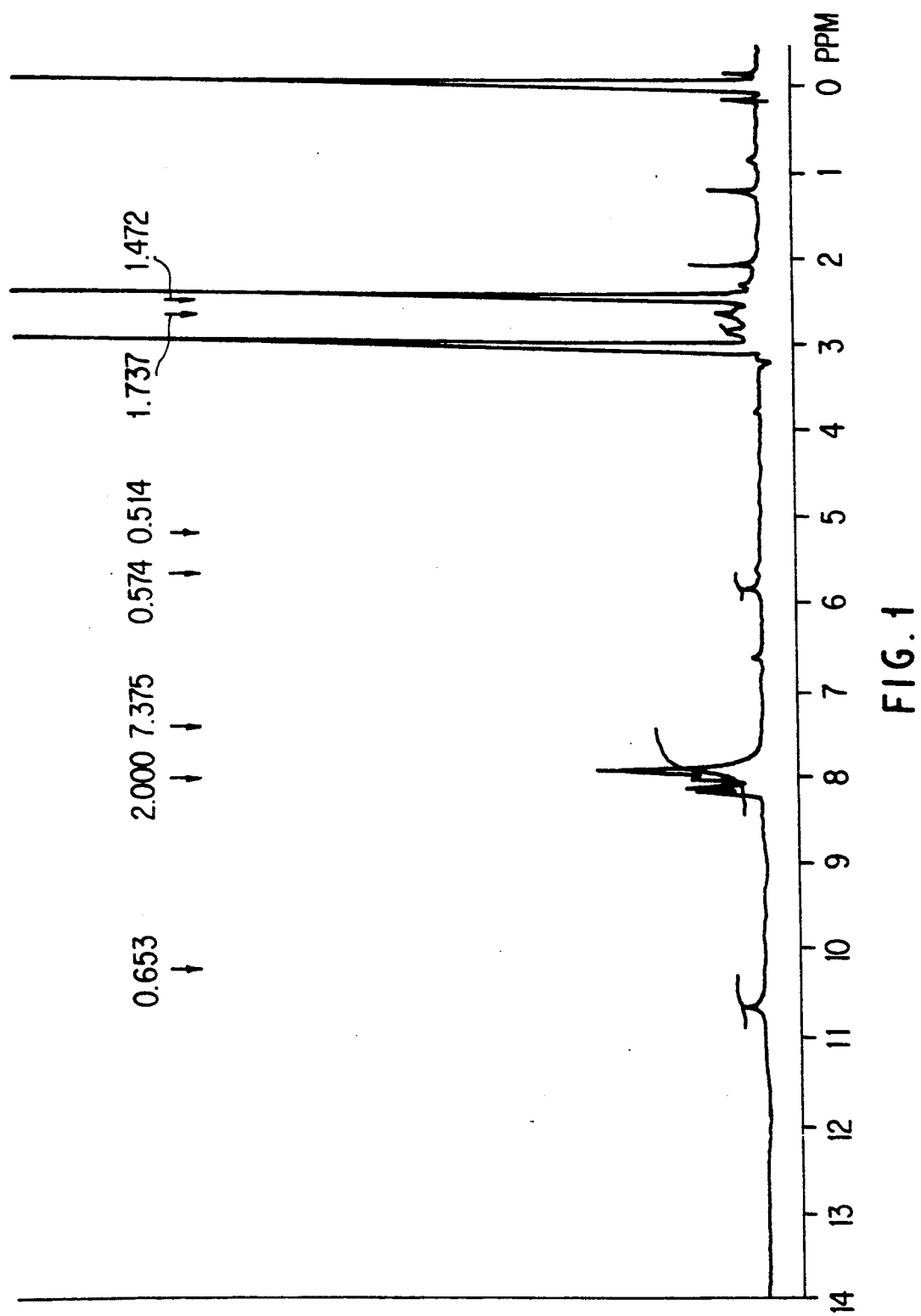
FIG. 1 is a $^1$H-NMR chart of the polymer obtained in Example 1.

In the following, the present invention will be described in detail.

The polymer to be used in the present invention comprises 5 to 100 mole %, preferably 20 to 100 mole %, more preferably 50 to 100 mole % of the unit (I), 0 to 50 mole %, preferably 0 to 30 mole % of the unit (II) and 0 to 50 mole %, preferably 0 to 30 mole % of the unit (III).

A weight average molecular weight of the polymer (polymer mixture) to be used in the present invention is 10,000 to 2,000,000, preferably 500,000 to 1,000,000.

Next, the process for producing the polymer to be used in the present invention is to be described.

PREPARATION METHOD OF THE POLYMER

The polymer to be used in the present invention can be synthesized by, for example, the following four steps of (1) a polymerization process, (2) a hydrolysis process, (3) a process of converting to an acid chloride and (4) a process of introducing optical effective group (a group functional to light). Also, the synthesis route in which the process of converting to an acid chloride is omitted may be used.

(1) Polymerization process

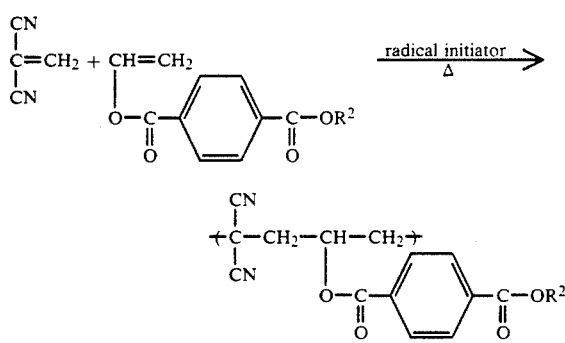

wherein $R^2$ represents an alkyl group.

Vinylidene cyanide and vinyl p-carboxyalkylbenzoate are polymerized in the presence of a radical initiator to synthesize vinylidene cyanide-vinyl p-carboxyalkylbenzoate copolymer.

The polymerization reaction can be carried out by the conventional manner.

The vinylidene cyanide-vinyl p-carboxyalkylbenzoate copolymer which is a starting material of the copolymer to be used in the present invention may be an alternative copolymer or a random copolymer, preferably an alternative copolymer of 1:1.

A molecular weight of the vinylidene cyanide-vinyl p-carboxyalkylbenzoate copolymer is preferably 10,000 to 2,000,000, more preferably 100,000 to 1,000,000.

(2) Hydrolysis process

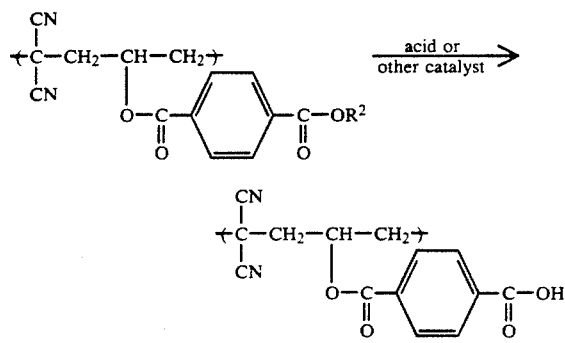

wherein $R^2$ has the same meaning as defined above.

The resulting vinylidene cyanide-vinyl p-carboxyalkylbenzoate copolymer is hydrolyzed by an acid or a catalyst to give a carboxylic acid.

As the acid to be used here, there may be mentioned, for example, hydrochloric acid, sulfuric acid, acetic acid and ifluoroacetic acid. These acids may be used singly or in combination of two or more.

These acids may be used by mixing with a solvent such as sulfolane, an alcohol including methanol and ethanol, and water.

As the catalyst as mentioned above, there may be mentioned, for example, a silane compound such as phenyl silane, and a tin compound.

A reaction temperature of the hydrolysis may be 60 to 100° C. and a reaction time may be several hours to several ten A hydrolysis ratio may be 5 to 100 %, preferably 50 to 100 %.

(3) Process of converting to acid chloride

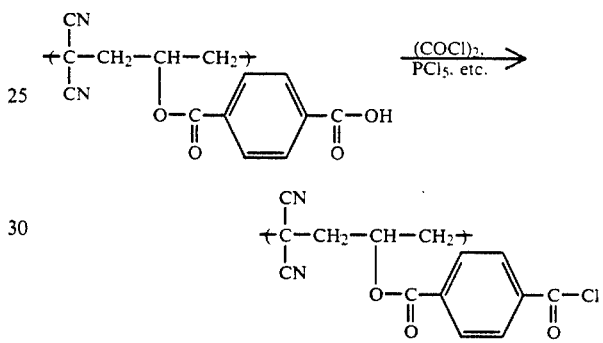

The resulting carboxylic acid is dissolved in an organic solvent and heated in the presence of a chlorinated compound for several hours to convert it into acid chloride.

As the organic solvent to be used, those which completely dissolve the carboxylic acid and have no reactivity with a chlorinated compound or acid chloride to be formed, and there may be mentioned, for example, sulfolane.

As the chlorinated compound to be used, general chlorinating reagent such as oxalic acid chloride, thionyl chloride and phosphorus pentachloride.

A temperature to be heated is preferably 30° to 100° C.

Next, after completion of the reaction for several hours, excess amounts of the chlorinated compound are completely removed by using a poor solvent to isolate and purify the acid chloride processed copolymer.

The poor solvent to be used is not particularly limited so long as it does not react with the acid chloride processed copolymer, and there may be mentioned, for example, an organic solvent such as toluene, benzene and hexane.

(4) Process of introducing optical effective group

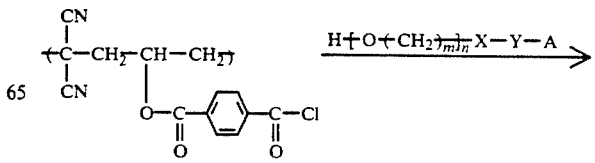

-continued

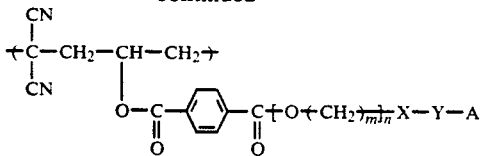

wherein m, n, X, Y and A have the same meanings as defined above.

The copolymer to be used in the present invention can be obtained by dissolving the resulting acid chloride processed copolymer in an organic solvent such as sulfolane again and then heating it with a nonlinear optical compound to be introduced.

As the nonlinear optical compound: H—[O—(CH$_2$)$_m$-]$_n$—X—Y—A (where m, n, X, Y, and A have the same meanings as defined above), there may be mentioned, for example, p-nitroaniline and derivatives thereof, 4-hydroxy-4'-biphenyl and derivatives thereof, 4-hydroxy-4'-nitrostilbene and derivatives thereof, 4-amino-4'-nitrostilbene and derivatives thereof, "Disperse Red 1" (trade name, available from Aldrich Co.) and derivatives thereof, and p-nitrophenylisocyanate and derivatives thereof.

A ratio of the nonlinear optical compound to be incorporated into the acid chloride processed copolymer may be 5 to 100 %, preferably 50 to 100 % based on the carboxylic acid or derivatives thereof (acid chloride) in the copolymer.

A temperature to be heated is preferably 50° to 100° C.

PREPARATION OF ORGANIC NONLINEAR OPTICAL MATERIAL

The organic nonlinear optical material of the present invention can be obtained by dissolving the polymer thus obtained in a solvent such as dimethylsulfoxide, N,N-dimethylacetamide and N,N-dimetylformamide which may be used singly or in combination of two or more, and then molding the mixture.

As the molding method, any known molding method may be used such as the solvent cast method, spin coat method and wet spinning method.

Also, the organic nonlinear optical material of the present invention may be molded by using the resulting polymer in the state of powder and using, for example, the press molding method or extrusion molding method.

The organic nonlinear optical material of the present invention can be used by molding and processing to a film or a fiber having a thickness or a diameter of 0.1 to 1000 μm, particularly 1 to 500 μm.

Also, when the organic nonlinear optical material of the present invention is a film or sheet, it is preferred to stretch to 2- to 6-fold in order to heighten its orientation property. As the stretching method at that case, mechanical monoaxial stretching or biaxial stretching is preferred.

In the organic nonlinear optical material of the present invention, its nonlinear optical effect can be enlarged by electrically polarizing the molded material which is molded to a desired shape such as a film, sheet or fiber.

As the method of polarizing electrically, for example, in the case that the organic nonlinear optical material is a film or sheet shape, there may be mentioned the method in which metal films as electrodes are adhered to both surfaces of the film or sheet and a voltage is applied thereto.

As an electrode to be provided to the organic nonlinear optical material, there may be mentioned a metal foil, a metal plate, a conductive paste or a metal coated film formed by chemical plating, vacuum deposition or sputtering.

The voltage to be applied to the electrodes may be 10 kv/cm or more and an electric field strength of not causing insulation breakage or so, preferably 100 to 1500 kv/cm.

A time of the polarizing process is not particularly limited and may be 10 minutes to 5 hours, preferably 10 minutes to 2 hours.

A temperature of the polarizing process may be, when the 0 glass transition temperature of the organic nonlinear optical material to be processed is Tg °C, Tg−20° C. to Tg +20° C., preferably Tg−5° C. to Tg+5° C.

Also, when the organic nonlinear optical material is formed by the spin coat method, the method in which the organic nonlinear optical material obtained by spin coating on a NESA glass and then drying under reduced pressure is polarized by using a usual corona discharging.

The conditions of the polarizing process using the corona discharging are the same as in the case of the film shaped or sheet shaped organic nonlinear optical material as mentioned above.

EXAMPLES

In the following, the present invention will be described in more detail by referring to Examples, but the present invention is not limited by these Examples.

EXAMPLE 1

Synthesis of a polymer to be used for an organic nonlinear optical material (1) Hydrolysis of vinylidene cyanide-vinyl p-carboxymethylbenzoate copolymer In a mixed solution of 200 ml of trifluoroacetic acid and 300 ml of hydrochloric acid was suspended 10 g of vinylidene cyanide-vinyl p-carboxymethylbenzoate copolymer prepared according to the conventional manner and the suspension was stirred at 80° C. for 10 hours. After completion of the reaction, the reaction mixture was poured into water and precipitated hydrolyzate was collected by filtration and washed with water repeatedly until washings become neutral. Next, drying under reduced pressure was carried out at 70° to 80° C. to obtain 8.8 g of a hydrolyzate represented by the formula shown below as white powder. An average molecular weight (Mw) of the vinylidene cyanide-vinyl p-carboxymethylbenzoate copolymer was 500,000. Identification of the resulting hydrolyzate was carried out by $^1$H-NMR (400 MHz, DMSO-d$_6$). As the results, it can be found that hydrolysis ratio at the ester portion of the vinyl benzoate unit was 96 %.

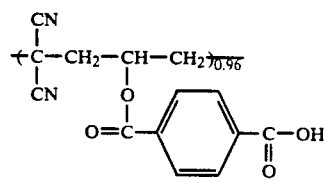

-continued

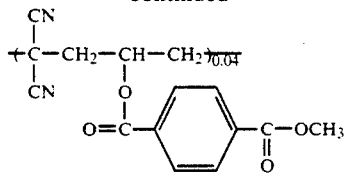

(2) Introduction of optical effective group into hydrolyzate

In 50 ml of sulfolane was dissolved 1 g of the hydrolyzate. To the mixture was added 2 ml of oxalic acid chloride and the mixture was stirred at 80° C. for 2 hours. Toluene was added to the mixture and excess amounts of oxalic acid chloride were removed by triturating the mixture several times. This material was dissolved again in 50 ml of sulfolane, and 1 g of p-nitroaniline was added thereto and the mixture was stirred under heating at 80° C. for 11 hours to obtain 320 mg of a polymer having the structural formula shown below in which p-nitroaniline is introduced at the side chain. This polymer had a glass transition temperature of 232° C. 1H-NMR chart of the resulting polymer is shown in FIG. 1. A ratio of each unit of the polymer determined based on the result is shown in the following structural formulae.

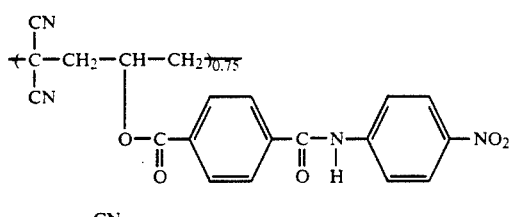

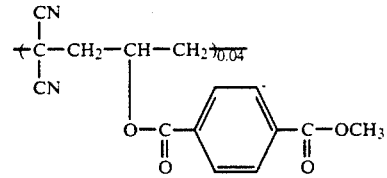

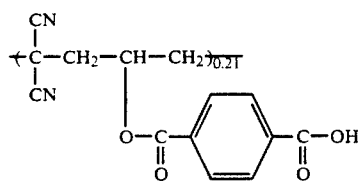

A molecular weight of the resulting polymer was measured by using GPC (gel permeation chromatography) and N,N-dimethyl-formamide as a solvent, and as the results, the polymer had a molecular weight (Mw) of 550,000.

EXAMPLE 2

In the same manner as in Example 1 except for using 2 g of 4-(6-hydroxyhexsiloxy)-4'-nitrobiphenyl in place of 1 g of p-nitroaniline, 520 mg of the polymer having the following structural formulae was obtained. The polymer had a glass transition temperature of 235° C. A ratio of each unit of the polymer determined based on the result of $^1$H-NMR is shown in the following structural formulae.

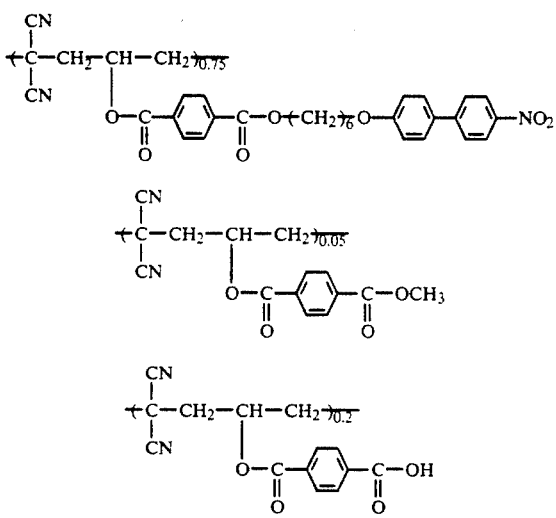

A molecular weight of the resulting polymer was measured in the same manner as in Example 1, and as the results, the polymer had a molecular weight (Mw) of 620,000.

EXAMPLE 3

In the same manner as in Example 1 except for using 2 g of Disperse Red 1 (trade name, available from Aldrich Co.) in place of 1 g of p-nitroaniline, 480 mg of the polymer having the following structural formulae was obtained. The polymer had a glass transition temperature of 242° C. A ratio of each unit of the polymer determined based on the result of $^1$H-NMR is shown in the following structural formulae.

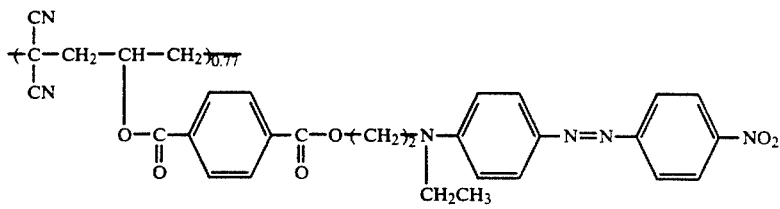

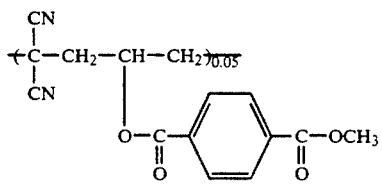

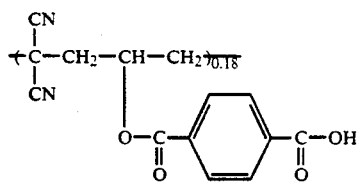

A molecular weight of the resulting polymer was measured in the same manner as in Example 1, and as the results, the polymer had a molecular weight (Mw) of 680,000.

EXAMPLE 4

Each polymer synthesized in Examples 1 to 3 was dissolved in N,N-dimethylacetamide, respectively, and each solution was coated on a NESA glass by spin coating and dried under reduced pressure to obtain a thin film. Corona polarization was subjected to the spin coat film.

With regard to the spin coat film thus polarization processing, measurement of secondary nonlinear optical constant ($d_{33}$) was carried out according to the method of Jerphagnon et al. (J. Appl. Phys., 41, 1967 (1970)). The results are shown in Table 1.

TABLE 1

| | Polarization temperature (°C.) | Secondary nonlinear optical constant $d_{33}$ (pm/v) |
|---|---|---|
| Polymer of Example 1 | 235 | 21 |
| Polymer of Example 2 | 240 | 25 |
| Polymer of Example 3 | 245 | 15 |

The organic nonlinear optical material of the present invention has large nonlinear optical effect and yet is excellent in molding processability so that it is useful for an optical material such as optical wavelength conversion, optical shutter, optical polarization element, light strength or phase modulation element and high speed light switching element and thus can be widely applied to the fields of optical communication, optical information processing and optical processings. Also, the organic nonlinear optical material of the present invention is excellent not only in the wavelength conversion or electro-optic effect but also piezoelectric or pyroelectric effect so that it can be widely applied to speaker, headphone, ultrasonic wave element, various kinds of sensors such as impact sensor and acceleration sensor, and various kinds of detectors such as infrared sensor, crime prevention sensor, temperature sensor and fire detection.

We claim:

1. An organic nonlinear optical material which comprises a polymer having the following constitutional units, in amounts of 5 to 100 mole % of (I), 0 to 50 mole % of (II) and 0 to 50 mole % of (III), and a weight average molecular weight (Mw) of the polymer being 10,000 to 2,000,000:

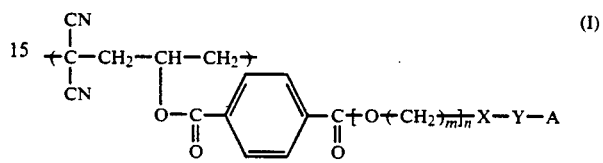

wherein m represents an integer of 1 to 10, n represents 0 or 1, X represents —$NR^1$— or —O—, $R^1$ represents hydrogen, methyl or ethyl, Y represents

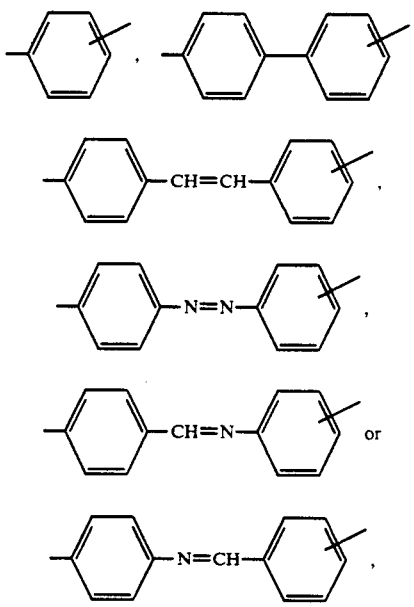

A represents —$NO_2$, —CN, —$CF_3$ or —$SO_2$—$C_lH_{2l+1}$ and $l$ represents an integer of 1 to 100,

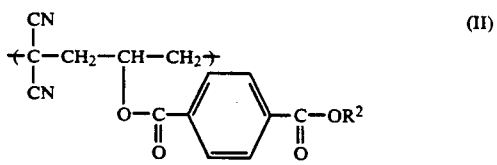

wherein $R^2$ represents an alkyl group, and

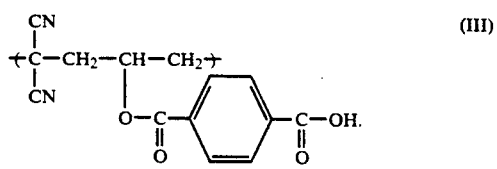

2. The material according to claim 1, wherein an amount of said unit (I) is 50 to 100 mole % and amounts of said units (II) and (III) are each independently 0 to 30 mole %.

3. The material according to claim 1, wherein —Y—A in the unit (I) is selected from

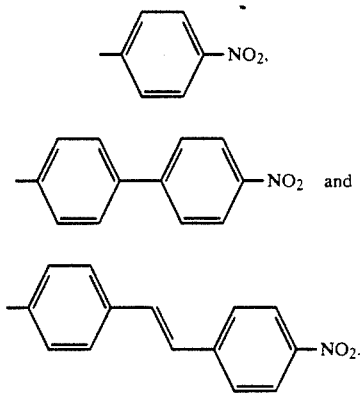

4. The material according to claim 1, wherein the polymer has the following constitutional units (a), (b) and (c):

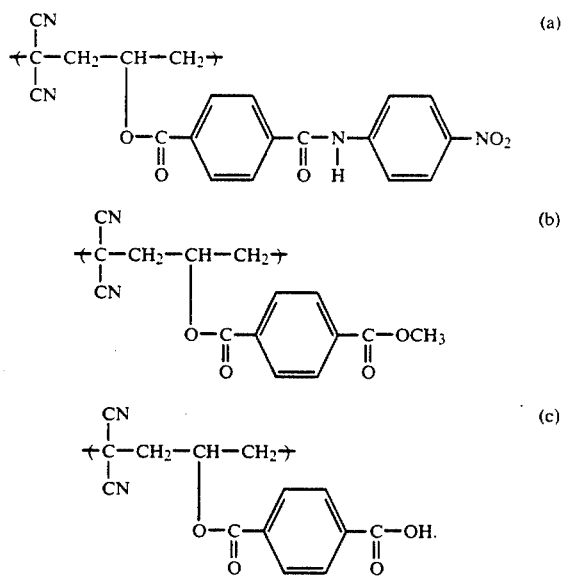

5. The material according to claim 1, wherein the polymer has the following constitutional units (a), (b) and (c):

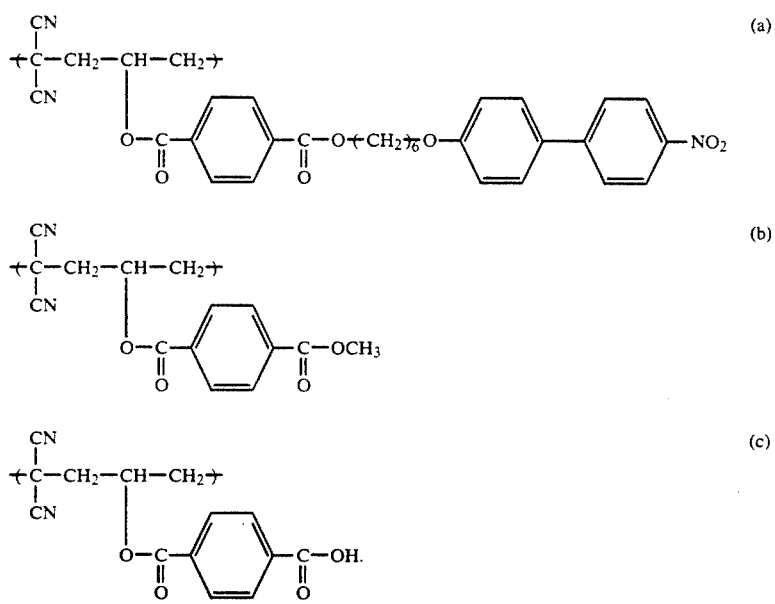

6. The material according to claim 1, wherein the polymer has the following constitutional units (a), (b) and (c):

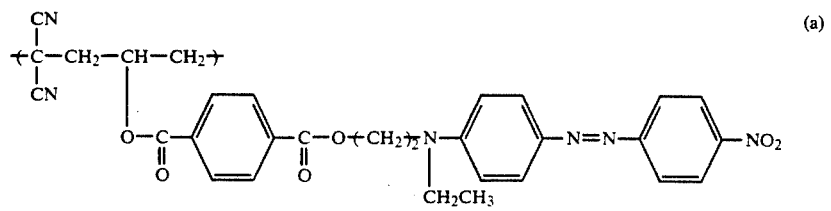

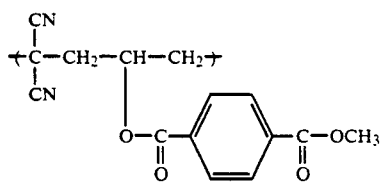

(b)

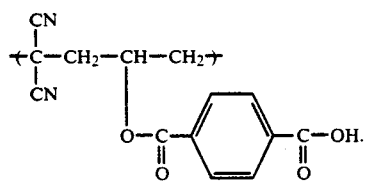

(c)

7. The material according to claim 1, wherein said material is molded into a film or a sheet having a thickness or a diameter of 0.1 to 1000 μm.

8. The material according to claim 1, wherein said material is stretched to 2- to 6-fold after molding into a film.

9. The material according to claim 1, wherein said material is molded into a film and polarized by an electric field of 10 kv/cm on both surfaces.

* * * * *